Jan. 19, 1971  G. L. TURNER  3,555,636
ADJUSTABLE SIZE HOSE CLAMP

Filed July 2, 1969  2 Sheets-Sheet 1

INVENTOR
GEORGE L. TURNER

BY Roy A. Plant

ATTORNEY

Jan. 19, 1971 G. L. TURNER 3,555,636
ADJUSTABLE SIZE HOSE CLAMP
Filed July 2, 1969 2 Sheets-Sheet 2
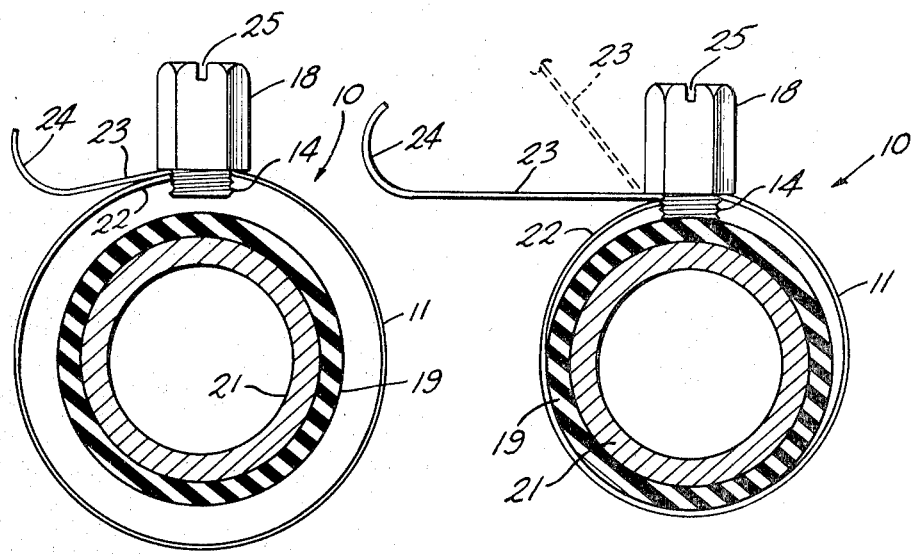
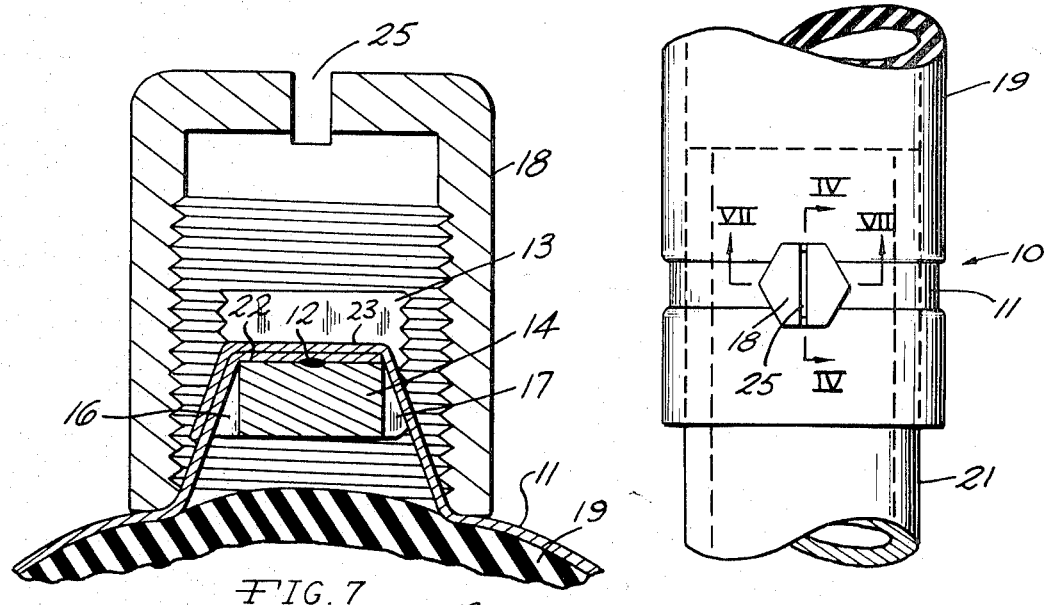
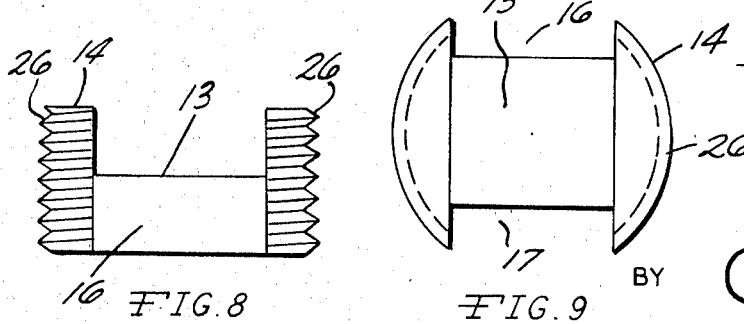
INVENTOR
GEORGE L. TURNER
BY Roy A. Plant
ATTORNEY

United States Patent Office 3,555,636
Patented Jan. 19, 1971

3,555,636
ADJUSTABLE SIZE HOSE CLAMP
George L. Turner, Hickory Corners, Mich., assignor to American Stamping Co., Battle Creek, Mich., a corporation of Michigan
Filed July 2, 1969, Ser. No. 838,597
Int. Cl. B65d 63/00
U.S. Cl. 24—278
10 Claims

ABSTRACT OF THE DISCLOSURE

This hose clamp is of an adjustable size which will fit a range of hose sizes thus making it more universal in use than single size hose clamps. The ends of the hose clamp strap overlap each other, with one end fastened to the top of an externally threaded side grooved floating nut, while the other end is shiftable across the anchored first end to vary the hose clamp diameter to fit the size of the hose to be gripped on a male member within the hose end. With the strap mounted in preliminary clamping position one the hose end, an elongated internally threaded nut is engaged with the upper end of the floating nut so that by rotating the internally threaded nut it will move the floating nut upward into same and with it the end portions of the strap above the floating nut to tighten the strap on the hose, following which the free end of the strap may be broken off to leave the hose clamp in anchored position.

BACKGROUND OF THE INVENTION

The hose clamp of the present invention is an improvement on the construction set forth in my copending patent application Serial No. 824,961, and is in the form of an adjustable size clamping means particularly adapted for use in anchoring such items as an automobile radiator hose in place for conventional use, as well as anchoring other items such as hose connected to an automatic washing machine, and the like. Many times the person needing a replacement hose clamp does not know the exact size needed, so that a hose clamp which will fit a range of sizes will solve the buyer's problem without his having to go home and measure the diameter of the hose to be clamped. There have been many types of hose clamps used in the past, with one common form being made of a heavy metal band having overlapping end portions, with each end having a preforated turned-up ear portion for receiving a stove bolt, or the like, tangentially of the band at its end portions for use in tightening the clamp on the hose around which it is placed. This same form of clamp has more recently been made out of relatively heavy wire, but operating on the same tightening principle. More recently heavy steel spring wire clamps with overlapping ends have come into use and which are mounted and dismounted with a tong-like tool which operates like a pair of pliers, such that by squeezing the outturned ends of the clamp toward each other expands the size of the clamp to make possible mounting or dismounting the clamp on the hose. Still other forms of hose clamps have come onto the market, for instance the ones with uniformly spaced cross slits in the center of the band portion of the hose clamp, wherein a holding member is used for receiving the band ends in turned-out position and having a coarse threaded screw extending perpendicular to the clamp between the band ends position to engage these slots and use them as threads for tightening the hose clamp in place.

Of these previous constructions, some of which worked relatively satisfactorily, all have had drawbacks such as being complex in construction, weak and subject to breakage, difficult for the untrained to use, and generally too expensive to produce and use in this era where competition and cost cutting is the rule which determines success or failure of the product on the open market regardless of how good it actually proves to be. It was a recognition of the commercial need of a more simplified, and easy to use, low-cost, strong and stable adjustable size hose coupling which led to the conception and development of the present invention.

SUMMARY OF THE INVENTION

Accordingly, among the objects of the present invention is the provision of a highly simplified, easy to manufacture and easy to use hose coupling, which is strong, efficient, and of relatively low cost.

Another object of this invention is to provide a hose clamp, the ends of the band of which can be held while being tightened in place by means of an extremely threaded side and top grooved floating nut, and an elongated internally threaded nut adapted to engage the threads of said floating nut to pull the ends of said band up into the former to tighten said hose clamp in place by thus decreasing the diameter of the strap portion of said hose clamp.

A further object is to provide a hose clamp of the floating nut and internally threaded tightening nut type which is preliminarily adjustable over a range of sizes, and finally tightened in hose clamping manner by appropriately rotating the internally threaded nut in engagement with the floating nut after the preliminary tightening has taken place.

A further object is to provide a new adjustable size hose clamp mounting and dismounting method.

Still further objects and advantages of the invention will appear as the description proceeds.

To the accomplishment of the foregoing and related ends, the invention, then, consists of the hose clamp means and/or features hereinafter fully described and particularly pointed out in the claims, the annexed drawings and the following description setting forth in detail certain illustrative embodiments of the adjustable size hose clamp inventioin, such embodiments illustrating, however, but one of the various ways in which the principle of the invention may be used.

BRIEF DESCRIPTION OF THE DRAWINGS

FIG. 2 is an edge view of the assembled adjustable hose clamp loosely mounted in place on a piece of hose ready for preliminary adjusting to loosely fit the size of the hose to be clamped, as generally viewed along line II—II in FIG. 1, looking in the direction of the arrows.

FIG. 3 is an edge view of the adjustable hose clamp of FIG. 2 preliminarily adjusted to the size of the hose to be clamped.

FIG. 6 is a top assembly view of the hose clamp of the present invention tightened in place on the end portion of a piece of hose.

FIG. 7 is an enlarged fragmentary section view taken along line VII—VII of FIG. 6, looking in the direction of the arrows.

FIG. 8 is an enlarged side view of the floating nut of the present invention.

FIG. 9 is an enlarged top view of the floating nut shown in FIG. 8.

PREFERRED EMBODIMENT

Figure 1:
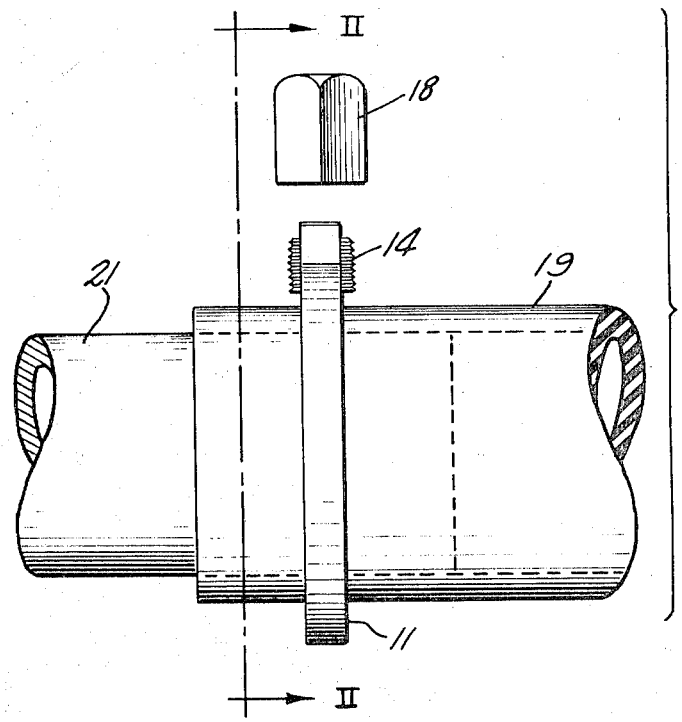
FIG. 1 is an exploded elevational assembly view of the adjustable size hose clamp of the present invention with the band of same in mounted position.
Figures 4, 5:
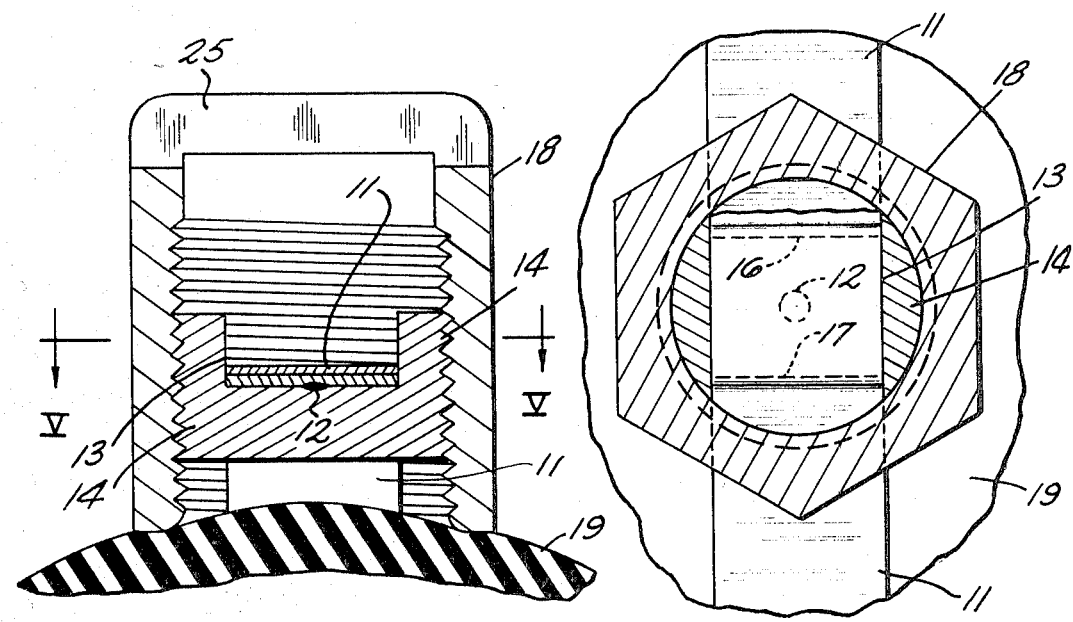
FIG. 4 is an enlarged fragmentary section view taken along line IV—IV of FIG. 6, looking in the direction of the arrows after the hose clamp has been fully tightened.
FIG. 5 is an enlarged fragmentary section view taken along line V—V of FIG. 4, looking in the direction of the arrows.

Referring to the drawings, it will be noted that the hose clamp assembly 10 has a band or strap 11, preferably made of stainless steel, with one end anchored in conventional manner, such as by spot welding 12, FIG. 4, to the bottom of a relatively deep top cross recess 13 in externally threaded floating nut 14. As shown in FIG. 4, recess 13 is preferably several times as deep as the thickness of the strap 11, for instance from 1/16-inch to 5/16-inch deep, to provide ample threads to engage nut 18. This band 11, for instance, may be .015-inch thick and 5/16-inch wide stainless steel, although conventional band stock can be used. At each end of cross recess 13 the sides of floating nut 14 are provided with continuation side recesses 16 and 17, FIGS. 7, 8 and 9, for reception of the end portions 22 and 23 of band 11 so that same can be drawn up into the internally threaded nut 18 to tighten the hose clamp assembly 10 in place on the end of the hose 19 to be fastened to the sleeve 21, FIGS. 1 and 6. These side grooves should be of a depth so that the bottom of the threads of floating nut 14 will clear the outer face of band 11 when the latter is up against the bottom of said side groove, thus facilitating tightening of nut 18.

End 22 of band 11 is the one which is anchored to floating nut 14 by spot welding 12 or the like (such as riveting) while the other end 23 of band 11 is free for adjusting, FIGS. 2 and 3. This free end 23 may be provided with a gripping means, such as a hook 24, to facilitate manually tightening the hose clamp 10 in place, and then applying final clamping pressure as shown in FIG. 6.

After manually tightening the adjustable hose clamp 10, FIG. 3, by pulling hook 24, while holding the clamp in desired position, the internally threaded nut 18 is turned while in threaded engagement with the upper end portion of floating nut 14, to start drawing the latter up into the former and with it the end portions 22 and 23 extending over cross recess 13 of floating nut 14 until the floating nut 14 is wholly within nut 18 and tightened, whereupon the extending end portion of 23 with its hook 24 may be removed, for instance by bending it back and forth, FIG. 3, until same breaks off. Further final tightening of nut 18 then draws ends 22 and 23 further into same until the hose clamp is fully tightened as shown in FIGS. 6 and 7.

To facilitate rapid preliminary tightening of the hose clamp assembly after same has been manually tightened by pulling hook end 24 of band 11 to the position shown in FIG. 3, a screwdriver (not shown) may be used and engaged with kerf 25 of nut 18 to complete the preliminary tightening. Internally threaded nut 18 is preferably deep for maximum tightening capability and hexagonal in shape to facilitate engaging same with a wrench (not shown) for final tightening, although, if desired, the wrench could be used to handle the whole tightening without using a screwdriver. To facilitate threadedly starting internally threaded nut 18 on floating nut 14, the latter is preferably provided with a chamfered lead-on end 26, as shown in FIG. 8.

While a preferred embodiment of the adjustable size hose coupling of the present invention has been illustrated and described herein, as well as directional terms to facilitate describing the invention, it is to be understood that modfications of the directional terms as well as the tightening and size adjusting portion of the adjustable hose clamp can be made without departing from the spirit and scope of the invention, as herein described and illustrated.

I therefore particularly point out and distinctly claim as my invention:

1. A hose clamp, comprising in combination a flexible strap, an externally threaded floating nut, which nut has longitudinal grooves on its opposite sides to receive portions of said strap, an internally threaded nut for engaging the threads on said floating nut, and means for anchoring one end of said strap to the upper portion of said floating nut while initially leaving the other end of said strap freely slidable across said first end for preliminary size adjustment.

2. A hose clamp as set forth in claim 1, wherein said externally threaded floating nut has a deep cross groove in its top face to receive said flexible strap, said deep cross groove being in alinement with and forming a continuation of said side grooves and of a depth to facilitate engagement of said internally threaded nut with the threads on said floating nut before said internally threaded nut contacts said flexible strap for drawing same thereinto to tighten same.

3. A hose clamp as set forth in claim 2, wherein the top of the threaded portion of said floating nut and the bottom portion of said internally threaded nut have cooperating means to facilitate initial engagement of the threads in same in the tightening of said hose clamp.

4. A hose clamp as set forth in claim 3, wherein the top of the threaded portion of said floating nut has a chamfered edge shape to facilitate initial engagement with the threads in the internally threaded nut in the tightening of the hose clamp.

5. A hose clamp as set forth in claim 1, wherein the free end of said flexible strap has means for use in gripping same to pull for preliminary size adjustment of said hose clamp before starting the final tightening operation.

6. A hose clamp as set forth in claim 5, wherein said gripping means is in the form of a hook on the free end of said flexible strap.

7. The method of making and assembling an adjustable size hose clamp of the character described, which comprises forming an externally threaded floating nut with alined top and side grooves, forming a flexible metal hose clamp strap of predetermined length needed for the particular size adjustable hose clamp to be made, forming an ear on one end of said strap of a length to fit substantially the full length of said top groove of said floating nut, anchoring said strap end in said top groove, forming an extension portion of said strap substantially at right angles to said ear and joining the end of same, said extension portion of said strap extending at least a major portion of the length of said side groove of said floating nut and fitting same, the remainder of said strap extending freely, wrapping said freely extending end portion of said strap around the hose to be clamped including passing said end portion over the anchored end of said strap in said top groove with an end to be pulled to preliminary tighten said hose clamp, and forming an internally threaded, smooth bottom, nut for threadedly fitting and receiving said floating nut from its cross grooved top end, so that when said strap has been preliminary tightened, the tightening of said internally threaded nut will move said floating nut up into same along with the end portions of said strap fitting in said cross groove, thus pulling part of the extending portions of said strap into said nut with resultant tightening of said hose clamp.

8. The method of making and assembling an adjustable hose clamp of the character described as set forth in claim 7, including the step of removing the extending free end of said strap when said hose clamp is firmly anchored in place.

9. The method of tightening in place an adjustable hose clamp having an internally threaded, smooth bottom, clamp tightening nut, an elongated strap, and an externally threaded floating nut having a deep top cross groove with shallower side grooves in alinement with same, said elongated strap having one free end and one end anchored to said floating nut in said deep top cross groove, which comprises wrapping said strap closely around the item to be clamped with the top cross groove of said floating nut extending outward and with the free end portion of said strap extending across and in contact with the outer face of said strap end anchored to said nut, pulling the free end of said strap to preliminary tighten the hose clamp on the item to be clamped, engaging said internally threaded nut with the threads on the upper end of said floating nut and tightening same to draw the end portions of said strap extending from opposite sides of said floating nut up into said internally threaded nut to tighten said hose clamp.

10. The method of tightening in place an adjustable hose clamp as set forth in claim 9, including the step of removing the extending free end of said strap when said hose clamp is firmly anchored in place.

References Cited

UNITED STATES PATENTS

| 1,053,684 | 2/1913 | Vogel | 24—278UX |
| 1,584,332 | 5/1926 | Tetzlaff | 24—278 |
| 2,621,383 | 12/1952 | Tresidder et al. | 24—278 |
| 2,673,383 | 3/1954 | Calder | 24—278 |

DONALD A. GRIFFIN, Primary Examiner